United States Patent
Yano

(10) Patent No.: US 7,016,123 B2
(45) Date of Patent: Mar. 21, 2006

(54) LENS APPARATUS AND IMAGE TAKING APPARATUS

(75) Inventor: Yukiteru Yano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 10/991,432

(22) Filed: Nov. 19, 2004

(65) Prior Publication Data
US 2005/0134976 A1 Jun. 23, 2005

(30) Foreign Application Priority Data
Nov. 25, 2003 (JP) ............... 2003-394267

(51) Int. Cl.
G02B 15/14 (2006.01)

(52) U.S. Cl. .............. 359/697; 359/696; 359/704

(58) Field of Classification Search ........... 359/696, 359/697, 694, 704, 823
See application file for complete search history.

(56) References Cited

U.S. PATENT DOCUMENTS

| | | | | | |
|---|---|---|---|---|---|
| 4,841,327 | A | * | 6/1989 | Yamamoto et al. | 396/257 |
| 5,146,260 | A | * | 9/1992 | Yamamoto | 396/79 |
| 5,455,650 | A | * | 10/1995 | Fujiwara | 396/71 |
| 6,040,677 | A | * | 3/2000 | Oono et al. | 318/696 |

* cited by examiner

Primary Examiner—Ricky Mack
(74) Attorney, Agent, or Firm—Fitzpatrick, Cella, Harper & Scinto

(57) ABSTRACT

A lens apparatus which enables to reduce size is disclosed. The lens apparatus has a first member which is movable in the optical axis direction and holds a first lens unit; a second member which holds a second lens unit and the first member; a first motor which is mounted to the second member and generates a driving force for driving the first member; a diaphragm unit which is mounted to the second member and performs open and close operations; a second motor which is mounted to the second member and generates a driving force for driving the diaphragm unit; and a guide member which is mounted to the second member and guides the first member in the optical axis direction.

4 Claims, 10 Drawing Sheets

LENS APPARATUS AND IMAGE TAKING APPARATUS

BACKGROUND OF THE INVENTION

1. Field of the Invention

This invention concerns a lens apparatus for forming a object image on an image pickup element and particularly concerns the positioning of a motor, incorporated in a lens apparatus, etc.

2. Description of the Related Art

Conventionally, collapsible lens apparatuses, with which the total lens apparatus length is made variable between a usage state, wherein a plurality of image taking lenses are positioned at desirable lens intervals during image taking, and a housed state, wherein the lens intervals and interval with respect to an image pickup plane are narrowed, have been used popularly in digital still cameras, etc.

The varying of the total lens apparatus length is carried out by means of cams, helicoids, and other moving mechanisms to set the lens apparatus to an appropriate configuration. A zoom lens apparatus can also be arranged, with which the focal length is varied by driving a plurality of lens units separately.

FIGS. 11 and 12 are sectional views including the optical axis of a conventional lens apparatus, with FIG. 11 showing the state of the lens apparatus in the non-image-taking state, in which the lens apparatus is housed in a housing region of a main body of camera. FIG. 12 shows the state of the lens apparatus during an image taking, wherein the lens apparatus is driven from the housing region to an image taking region.

In FIGS. 11 and 12, Reference Numeral 101 denotes an image pickup element. The image pickup element 101 is a CCD, with 101a being an image pickup plane and 101b being a protective glass. Reference Numeral 102 denotes a CCD mounting base plate, which holds the image pickup element 101 and holds the respective parts that make up the lens apparatus to be described later. Reference Numeral 103 denotes an optical LPF (low pass filter), which makes use of the birefringence effect of quartz to repress the occurrence of luminance moiré and false colors. Reference Numeral 104 denotes a first lens unit that forms the optical system of the lens apparatus. Reference Numeral 105 denotes likewise a second lens unit and Reference Numeral 106 denotes a third lens unit.

Reference Numeral 107 denotes a fixed barrel with a substantially cylindrical shape that is fixed to the CCD mounting base plate 102. Reference Numeral 108 denotes a cam barrel with substantially cylindrical shape. On the outer peripheral surface of the cam barrel 108, a protrusion that serves as a cam follower is formed. A cam is formed on the inner peripheral surface of the fixed barrel 107, and engages with the cam follower 108a of the cam barrel 108. Upon application of a rotating force by an unillustrated driving portion, the cam barrel 108 moves in the optical axis direction while rotating around the optical axis in accordance with the cam track of the fixed barrel 107.

Reference Numeral 109 denotes a rectilinear barrel, which is rotatably engaged to the inner peripheral surface of the cam barrel 108. Reference Numeral 109a denotes a claw-shaped portion, which prevents the falling off of the rectilinear barrel 109 from the cam barrel 108. Reference Numeral 109b denotes a protrusion, extending in the radial direction of the lens apparatus from the rectilinear barrel 109. Reference numeral 107a denotes a rectilinear groove portion, which is formed in the inner peripheral surface of the fixed barrel 107 so as to extend in the optical axis direction. By the engagement action of the protrusion 109b and the rectilinear groove portion 107a, the rectilinear barrel 109 moves in the optical axis direction without rotating around the optical axis in accordance with the rotation operation of the cam barrel 108.

Reference Numeral 110 denotes a first lens unit holding barrel, which holds the first lens unit 104. Reference Numeral 110a denotes a first cam follower, which is fixed to the first lens unit holding barrel 110. The first cam follower 110a moves along the cam track of a first cam that is formed in the inner peripheral surface of the cam barrel 108. Reference Numeral 111 denotes a second lens unit holding barrel, which holds the second lens unit 105. As with the first lens unit holding barrel 110, the second lens unit holding barrel 111 is provided with a second cam follower, which protrudes outward in the radial direction. And the second cam follower moves along the track of a second cam formed in the inner peripheral surface of the cam barrel 108.

Furthermore, in the rectilinear barrel 109, an opening that extends in the optical axis direction is formed, and by the opening engaging with the first cam follower, the first lens unit holding barrel 110 moves rectilinearly. And the first lens unit holding barrel 110 moves, without rotating, in the optical axis direction along the first cam formed in the inner side of the cam barrel 108 in accordance with the rotation operation of the cam barrel 108. By the above arrangement, the first and second lens unit holding barrels 110 and 111 can be moved from the housing region to the image taking region.

Reference Numeral 112 denotes a third lens unit holding barrel, which holds the third lens unit 106. The third lens unit 106 is a lens unit for focusing, and the focusing operation is enabled by moving the third lens unit holding barrel 112 in the optical axis direction.

Reference Numeral 113 denotes a guide rod, which is fixed to the CCD mounting base plate 102 and supports the third lens unit holding barrel 112 in a manner enabling movement along the optical axis. Reference Numeral 114a denotes a screw, which rotates upon receiving a driving force from a motor 114. Reference Numeral 115a denotes a bearing of the guide rod 113 and 115b denotes a bearing, which supports the front end of the screw 114a. The bearings 115a and 115b are fixed to the CCD mounting base plate 102. A nut, which engages with the screw 114a, is supported in an unrotatable manner on the third lens unit holding barrel 112, and the third lens unit holding barrel 112 is thereby enabled to be moved in the optical axis direction by the motor 114 to perform the focusing operation.

With such an image taking apparatus having a housing region for housing a lens apparatus, portability and compact housing features are required in particular, and to be specific, the lens apparatus must be made compact in the radial direction and the total length of the lens apparatus in the collapsed state must be made as short as possible.

Thus there are cases where, in the collapsed state, the second lens unit holding barrel 111 is housed upon entering the range of movement of the third lens unit holding barrel 112 as shown in FIG. 11. With such an arrangement, in order to avoid interference (overlapping) with the guide rod 113, the screw 114a, the bearings 115a and 115b thereof, and other various parts for enabling the movement of the third lens unit holding barrel 112, openings must be provided in parts of the second lens unit holding barrel 111.

FIG. 13 shows the second lens unit holding barrel 111 as viewed from the front. As viewed from the front, the second lens unit holding barrel 111 has openings provided at three locations of its periphery in order to avoid interference (overlapping) with the bearing 115b of the screw 114a, the bearing 115a of the guide rod 113, and a bearing (not shown) for a rotation stopping rod for restraining the rotation of the third lens unit holding barrel 112 around the guide rod 113.

However, since the proportion of the area of the second lens unit holding barrel 111 that is taken up by the openings is large, the holding of the lenses may become unstable due to inadequate strength and lead to degradation of the optical performance. Leakage of light rays may also occur.

Here, leakage of light rays means the phenomenon in which light besides the light flux used for image taking reach the image pickup element. In the conventional lens apparatus, there are cases where light rays, which have become incident at a predetermined angle onto the first lens unit 104, become reflected by the inner peripheral surface of the rectilinear barrel 109 and become incident on the image pickup element 101 without passing through the second lens unit 105. However, since there are large openings in the second lens unit holding barrel 111, leakage of light rays could not be repressed and this represses the making of the lens apparatus compact.

On the other hand, if ribs are provided to increase the strength of the second lens unit holding barrel 111 that has openings, the lens apparatus becomes large. The meaning of designing the second lens unit holding barrel 111 so that it enters the movement range of the third lens unit holding barrel 112 in the collapsed state to enable the making of the lens apparatus compact is thereby lost.

Also, if the component parts of the third lens unit holding barrel 112 are positioned so as to avoid overlapping with the second lens unit holding barrel 111, the lens apparatus may become large in the radial direction.

This invention proposes an optimal positioning of the respective parts inside the lens apparatuses for resolving the above issues, and an object thereof is to realize the making of the lens apparatus compact.

SUMMARY OF THE INVENTION

A lens apparatus of one aspect of this invention is a lens apparatus comprising a first member which is movable in the optical axis direction and holds a first lens unit; a second member which holds a second lens unit and the first member; a first motor which is mounted to the second member and generates a driving force for driving the first member; a diaphragm unit which is mounted to the second member and performs open and close operations; a second motor which is mounted to the second member and generates a driving force for driving the diaphragm unit; and a guide member which is mounted to the second member and guides the first member in the optical axis direction.

In a case where a region of the second member viewed in the optical axis direction is divided into four regions by lines extending from the optical axis to positions corresponding to four corners of the image pickup element, the output shaft of the first motor is positioned in a first region of the four regions, the output shaft of the second motor is positioned in a second region, and the guide member is positioned in a third region.

An image taking apparatus of one aspect of this invention comprises the lens apparatus described above and an image pickup element which photoelectrically converts an object image formed by the lens apparatus.

The characteristics of the lens apparatus and the image taking apparatus according to this invention shall become clearer by the following detailed description of the embodiment with reference to the drawings.

DETAILED DESCRIPTION OF THE PREFERRED EMBODIMENT

An embodiment of this invention shall now be described.

Figure 1:
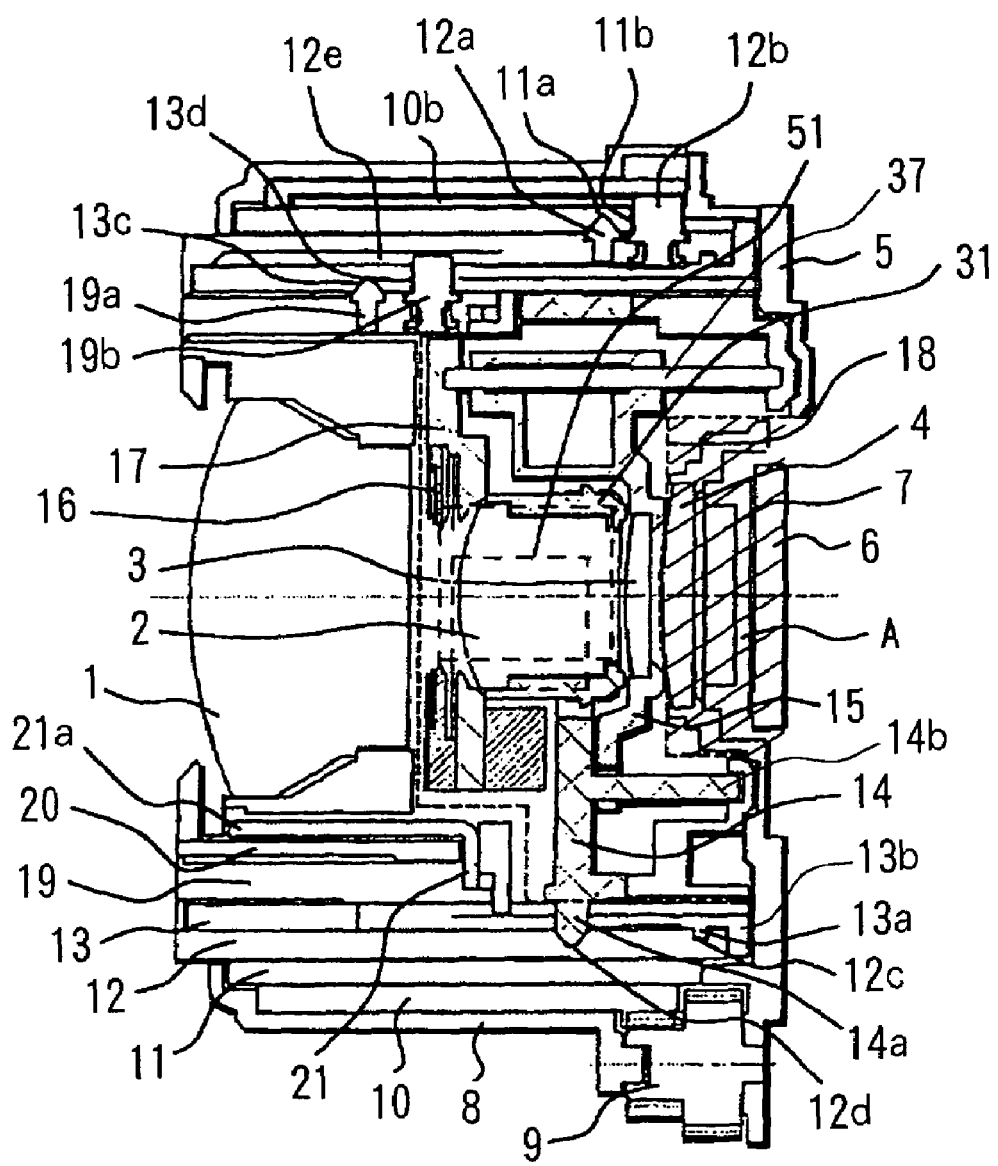
FIG. 1 is a sectional view including the optical axis of a lens apparatus according to an embodiment of this invention, in the collapsed state.
Figure 2:
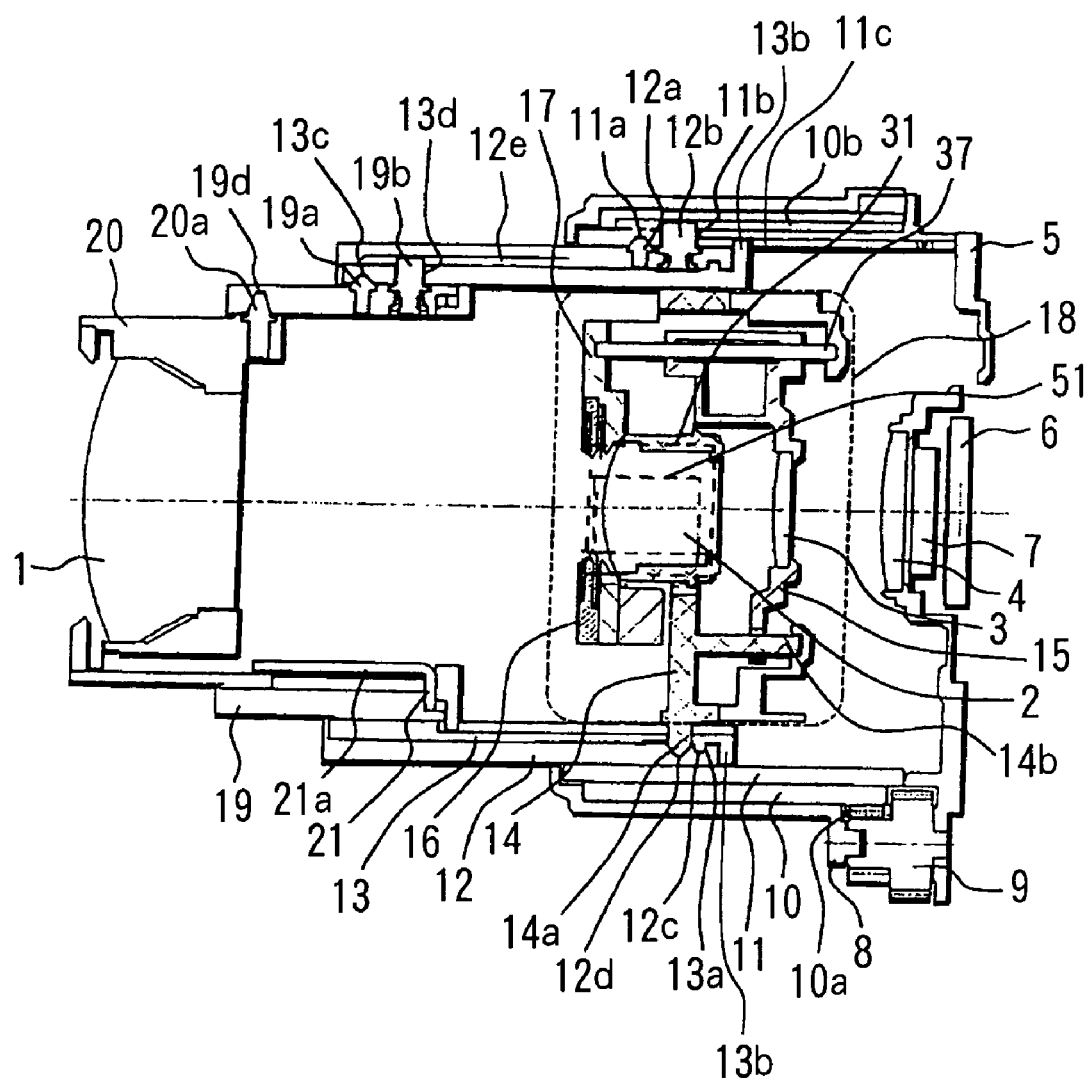
FIG. 2 is a sectional view including the optical axis of the lens apparatus in the image taking state.

FIG. 1 is a sectional view along the optical axis of a lens apparatus in the collapsed state, and FIG. 2 is a sectional view along the optical axis of the lens apparatus in the image taking state.

The optical system of the lens apparatus of this embodiment comprises a first lens unit 1 serving as a compensator lens, a second lens unit 2 serving as a variator lens, a third lens unit 3 serving as a focusing lens, and a fourth lens unit 4 serving as a fixed relay lens.

Reference Numeral 5 denotes a holding plate, holding an image pickup element 6, which, for example, is a CCD sensor or a CMOS image sensor. In the present embodiment, a CCD sensor is used as the image pickup element 6.

Reference Numeral 7 denotes an optical low-pass filter (referred to hereinafter as "optical LPF"), which represses the occurrence of luminance moiré and false colors and is positioned at the object side of the image pickup element 6. Reference Numeral 8 denotes a cover barrel with cylindrical shape, which is fixed to the holding plate 5 by means of unillustrated machine screws.

Reference Numeral 9 denotes a drive gear, which engages with a gear 10a, formed on the outer circumferential face of a drive barrel 10, and transmits the rotational force of an unillustrated motor to the drive barrel 10. The drive gear 9 is rotatably supported on the cover barrel 8 and the holding plate 5.

The drive barrel 10 is formed to a cylindrical shape and has rectilinear groove portions 10b, which extend along the optical axis direction, formed at three locations in the circumferential direction of its inner circumferential face.

At the inner side of the drive barrel 10, a fixed barrel 11, which is fixed to the cover barrel 8 and the holding plate 5, is housed. In the fixed barrel 11, a through hole portion 11b is formed, which extends incliningly with respect to the circumferential direction and is for passing through a drive cam pin 12b that is formed on the outer circumferential face of a moving cam barrel 12, to be described below. In the fixed barrel 11, a cam groove portion 11a is formed, which extends incliningly with respect to the circumferential direction. A cam follower pin 12a, provided on the outer circumferential face of the moving cam barrel 12 to be described below, engages with the cam groove portion 11a.

In the inner circumferential face of the moving cam barrel 12, a groove portion 12c, which extends incliningly with respect to the circumferential direction, is formed. And a protrusion 13a, formed on the outer circumferential face of a rectilinear barrel 13 to be described later, engages with the groove portion 12c.

At the rear end portion in the optical axis direction of the outer circumferential face of the rectilinear barrel 13, protrusions 13b are provided at equal intervals at three locations in the circumferential direction, and these protrusions 13b engage with rectilinear groove portions 11c, which are formed in the inner circumferential face of the fixed barrel 11 and extend in the optical axis direction.

With the above-described arrangement, when the drive barrel 10 starts to rotate around the optical axis by receiving the driving force from the drive source, the moving cam barrel 12 rotates around the optical axis by the engagement of the drive cam pin 12b and the rectilinear groove portion 10b and moves in the optical axis direction by the engagement of the cam follower pin 12a and the cam groove portion 11a.

Furthermore, since the protrusion 13a and the protrusions 13b respectively engages with the groove portion 12c formed in the moving cam barrel 12 and the rectilinear groove portions 11c formed in the fixed barrel 11, during the rotation of the moving cam barrel 12, the rectilinear barrel 13 moves in the optical axis direction without rotating around the optical axis.

The respective lens unit holding barrels shall now be described.

On the outer circumferential face of the second lens unit holding barrel 14 that holds the second lens unit 2, cam follower pins 14a are formed at equal intervals at three locations in the circumferential direction. The cam follower pins 14a pass through the through hole portions 13c formed in the rectilinear barrel 13 and engage with the groove portions 12d of the moving cam barrel 12.

Also, a third lens unit holding barrel 15, a shutter unit 16, and a diaphragm unit 17, which, along with the second lens unit holding barrel 14, make up a second barrel 18 (the construction in the area surrounded by the dotted line in FIGS. 1 and 2), are incorporated in the second lens unit holding barrel 14, the details of these components shall be described later.

At the inner side of the rectilinear barrel 13, a first cam barrel 19 is housed. On the outer circumferential face of the first cam barrel 19, a follower pin 19a, which has a tapered front end portion, and a drive pin 19b are provided. The follower pin 19a engages with a tapered cam 13c, which is formed in the inner circumferential face of the rectilinear barrel 13 and extends inclinedly with respect to the circumferential direction. The drive pin 19b is passed through a through hole portion 13d, formed in the rectilinear barrel 13, and engages with a rectilinear groove portion 12e of the moving cam barrel 12.

With the above-described arrangement, during the rotation of the moving cam barrel 12, the first cam barrel 19 moves in the optical axis direction while rotating around the optical axis along the tapered cam 13c.

In the inner circumferential surface of the first cam barrel 19, three tapered cams 19d are formed so as to extend inclinedly with respect to the circumferential direction. These tapered cams 19d have the same shape, are positioned at equal intervals, and engages with three follower pins 20a, provided on an outer circumferential face of a first lens unit holding barrel 20. An unillustrated rectilinear groove portion is formed in the first lens unit holding barrel 20. A rotation stopping portion 21a of a ring 21 with rotation stopping rod, which is fixed at a rear end portion in the optical axis direction of the first cam barrel 19, engages with the rectilinear groove portion. Therefore, the rotation of the first lens unit holding barrel 20 around the optical axis is prevented.

Thus when the first cam barrel 19 moves in the optical axis direction while rotating around the optical axis, the first lens unit holding barrel 20 moves in the optical axis direction along the cam track of the tapered cam 19d while being prevented in rotation around the optical axis by the rotation stopping portion 21a.

Figure 3:
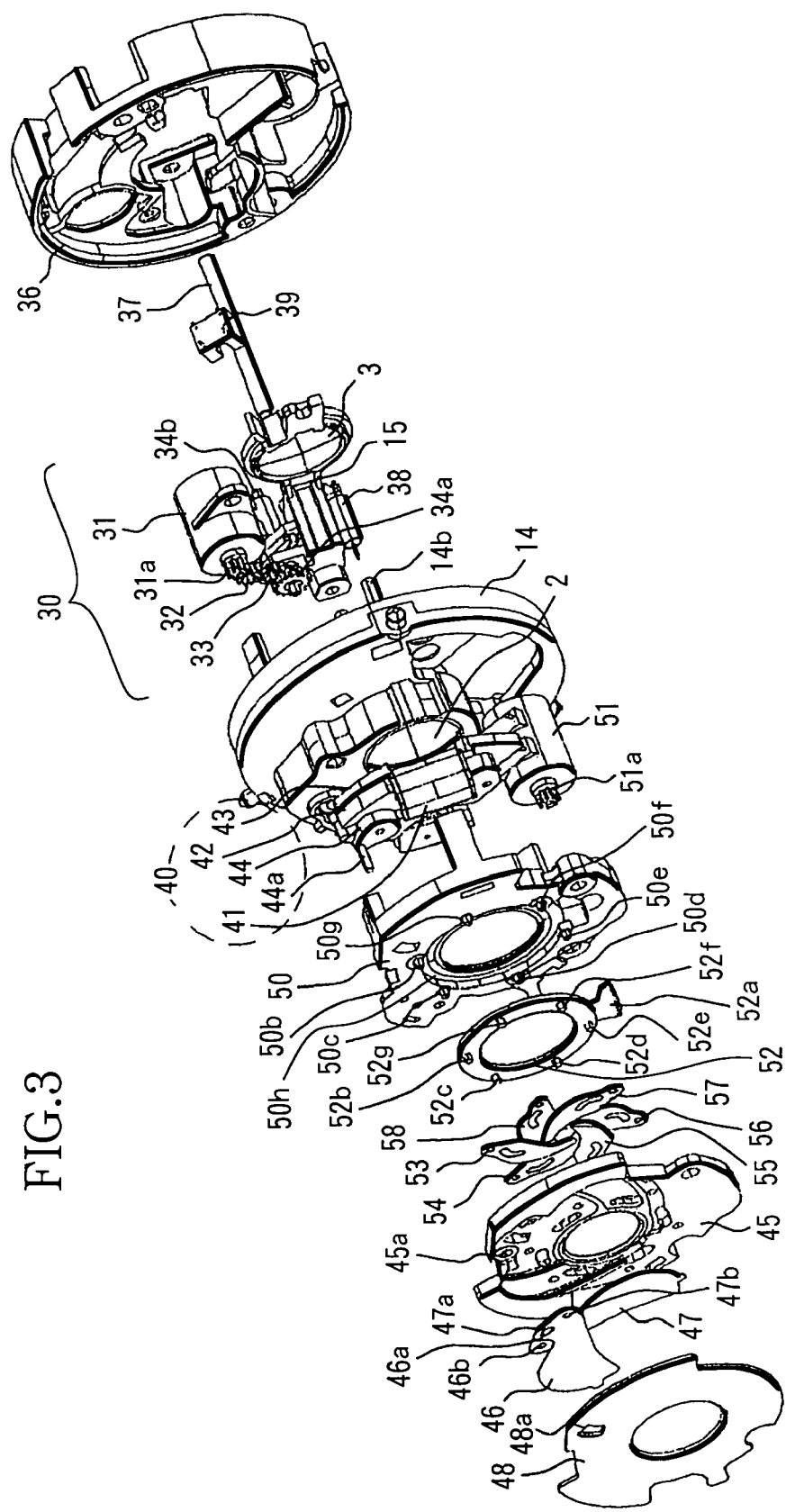
FIG. 3 is an exploded perspective view of a second barrel.
Figure 4:
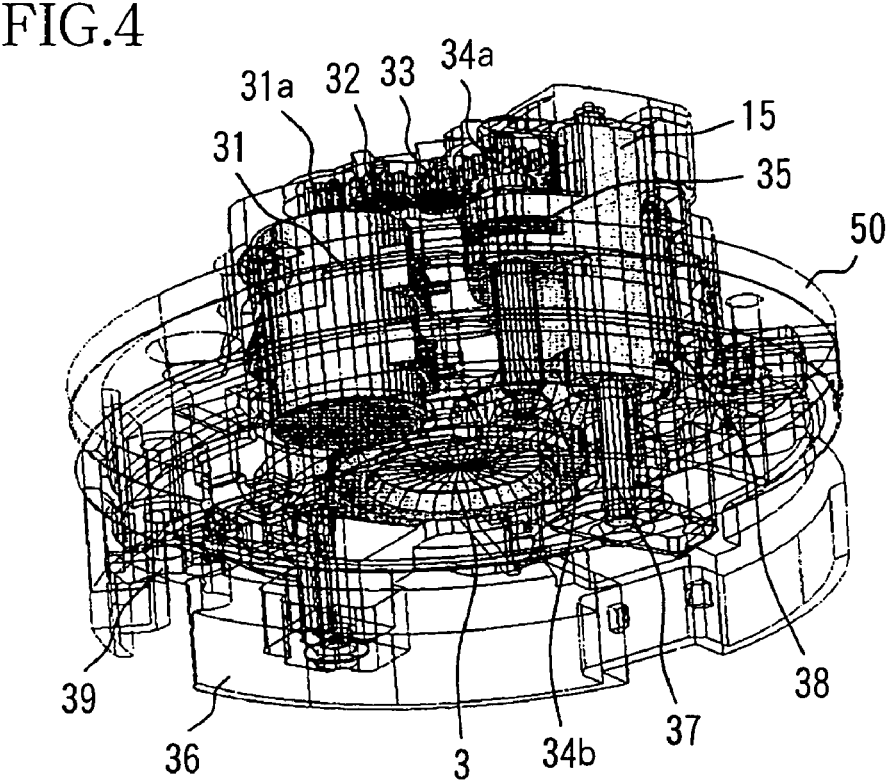
FIG. 4 is a perspective view of a focusing unit.

The construction of the abovementioned second barrel 18 shall now be described. FIG. 3 is an exploded perspective view of the second barrel 18. The arrangement of a focusing unit 30, which includes the third lens unit holding barrel 15, and the lens drive mechanism for the focusing operation shall now be described. FIG. 4 is a perspective view of the focusing unit of the second barrel 18.

Reference Numeral 31 denotes a stepping motor, which is fixed to the second lens unit holding barrel 14, and the driving force of the stepping motor 31 is transmitted in the order of: gear 31a→gear 32→gear 33→gear 34a. A screw 34b, which rotates integrally with the gear 34a, is fixed to the gear 34a.

Reference Numeral 35 denotes a nut that is fixed unrotatably to the third lens unit holding barrel 15, and the screw 34b is inserted into the nut 35.

Reference Numeral 36 denotes a third cap, which is fixed to the second lens unit holding barrel 14 and supports a guide shaft 37 and the screw 34b.

By the above arrangement, the driving force of the stepping motor 31 is transmitted in the order of: gear 31a→gear 32→gear 33→gear 34a→screw 34b, and the third lens unit holding barrel 15 thereby moves in the optical axis direction.

Reference Numeral 38 denotes a coil spring which biases the third lens unit holding barrel 15 towards the second lens unit holding barrel 14, and by the spring force of the coil spring 34, the play at the screw 34b can be repressed and stable driving is enabled.

Since it is difficult to perform stable driving of a focusing lens 3 by just the guiding by the guide shaft 37, an auxiliary guide shaft 14b is positioned at a position separated from guide shaft 37 to enable stable driving of the focusing lens 3.

Reference Numeral 39 denotes a photointerrupter (referred to hereinafter as "PI"), which is fixed to the second lens unit holding barrel 14 and is equipped with an unillustrated light emitting element and light receiving element.

The third lens unit holding barrel 15 is provided with a light-blocking plate, which blocks light emitted from the light emitting element of the PI 39, and the position of the third lens unit holding barrel 15 when the light is blocked by the light-blocking plate is deemed to be an initial position.

Since the movement amount of the third lens unit holding barrel 15 per step of the step drive of the stepping motor 30 is known in advance, the position of the third lens unit holding barrel 15 can be known by counting the number of steps that have been input. Though unillustrated, electrical wiring connected to the stepping motor 31 and the PI 39 is connected via a flexible circuit board, etc., to a power supply provided at the exterior of the third lens unit holding barrel 15.

The operations of the shutter unit 16 shall now be described.

Figure 5:
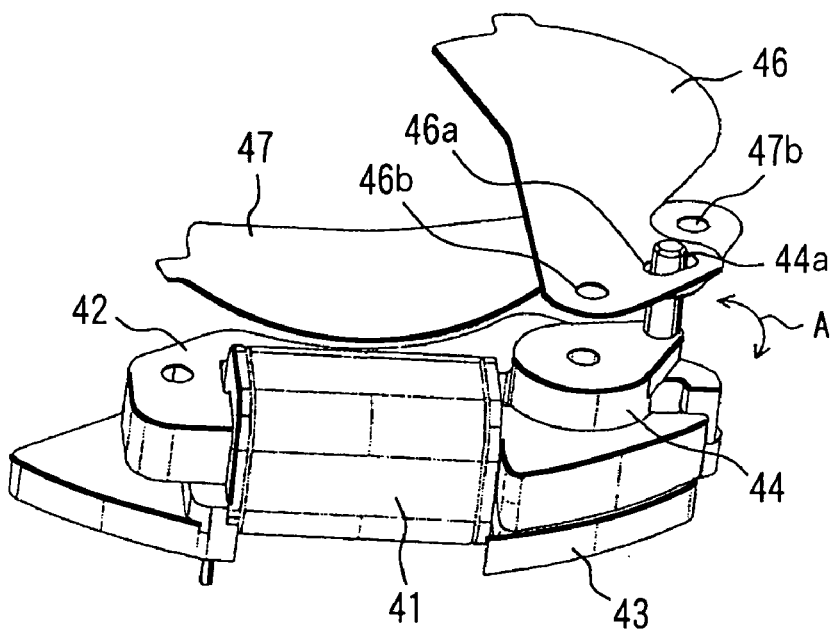
FIG. 5 is a perspective view of a shutter drive source and shutter blades.
Figure 6:
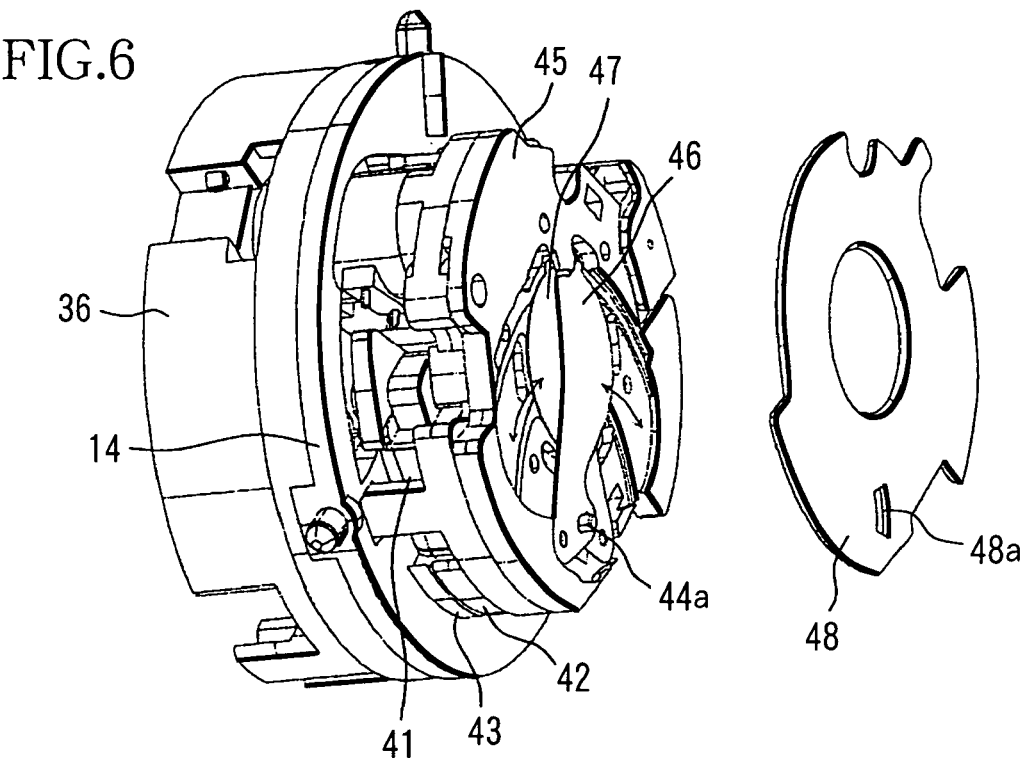
FIG. 6 is a perspective view of a shutter unit in the closed state.

FIG. 5 shows the state wherein shutter blades 46 and 47 are connected to a shutter drive unit 40 (see FIG. 3). In FIG. 5, the shutter blades 46 and 47 are in the opened state.

Reference Numeral 41 denotes a coil, which is wound around a bobbin, and the magnetic flux that is generated by energization of the coil 41 generates, via a yoke 42, a rotational force in the direction of arrow A on a magnet 44, on which an arm 44a is formed integrally.

A shutter cover 43 has an unillustrated hole portion, which rotatably supports an unillustrated rotating shaft that extends downward in FIG. 5 from the magnet 44. The shutter cover 43 holds the coil 41, the yoke 42, the magnet 44, the arm 44a, and a shutter base plate 45.

The arm 44a is inserted in an opening 45a, formed in the shutter base plate 45, and the length in the rotation direction of the arm 44a at the opening 45a is set to be slightly longer than the length in the radial direction of the arm 44a.

Thus by the arm 44a contacting the respective end faces of the opening 45a, the rotational range of the magnet 44 is restricted.

The arm 44a passes through openings 46a and 47a formed in the two shutter blades 46 and 47, and when the rotation operation of the arm 44a is started by energization of the coil 41 as mentioned above, the shutter blades 46 and 47 begin to rotate about the openings 46b and 47b, respectively.

In this process, the magnet 44 stops at the point at which the magnetic attractive force of the magnet 44 acts on the yoke 42. This state is thus maintained even after the energization of the coil 41 is terminated.

An opening 48a is formed in a shutter top plate 48, and by mounting the shutter top plate 48 after insertion of the arm 44a in the opening 48a, the falling-off of the shutter blades 46 and 47 is prevented.

Figure 7:
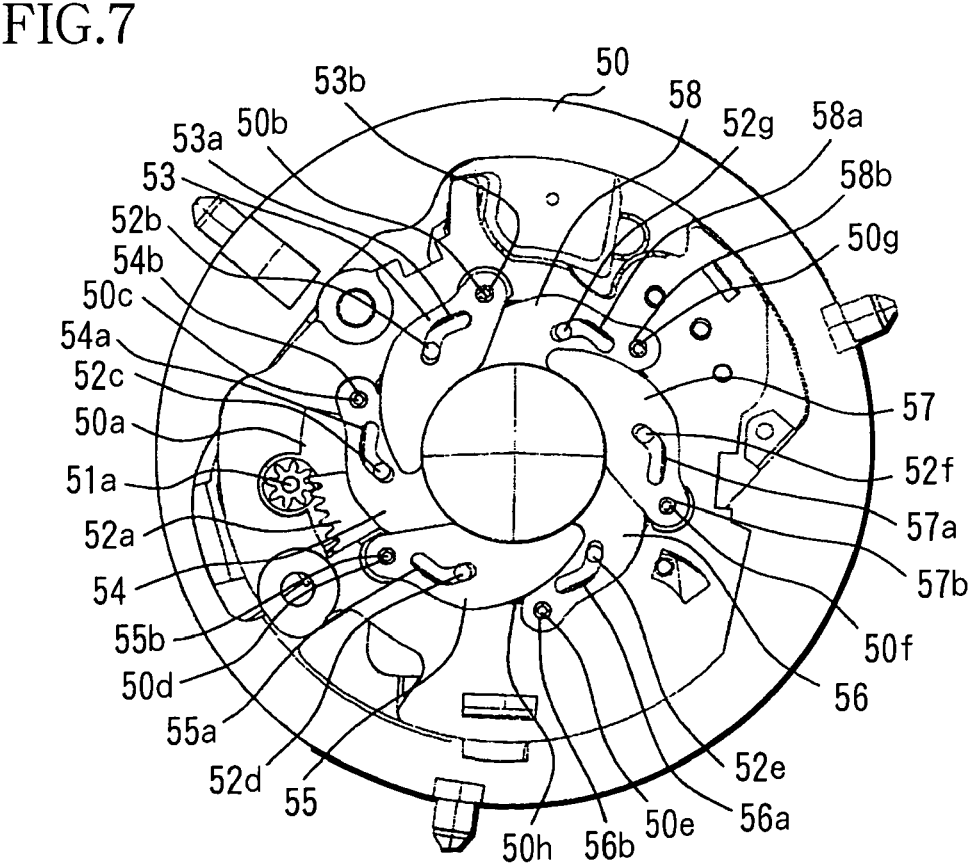
FIG. 7 shows a construction of a diaphragm mechanism in the open state.
Figure 8:
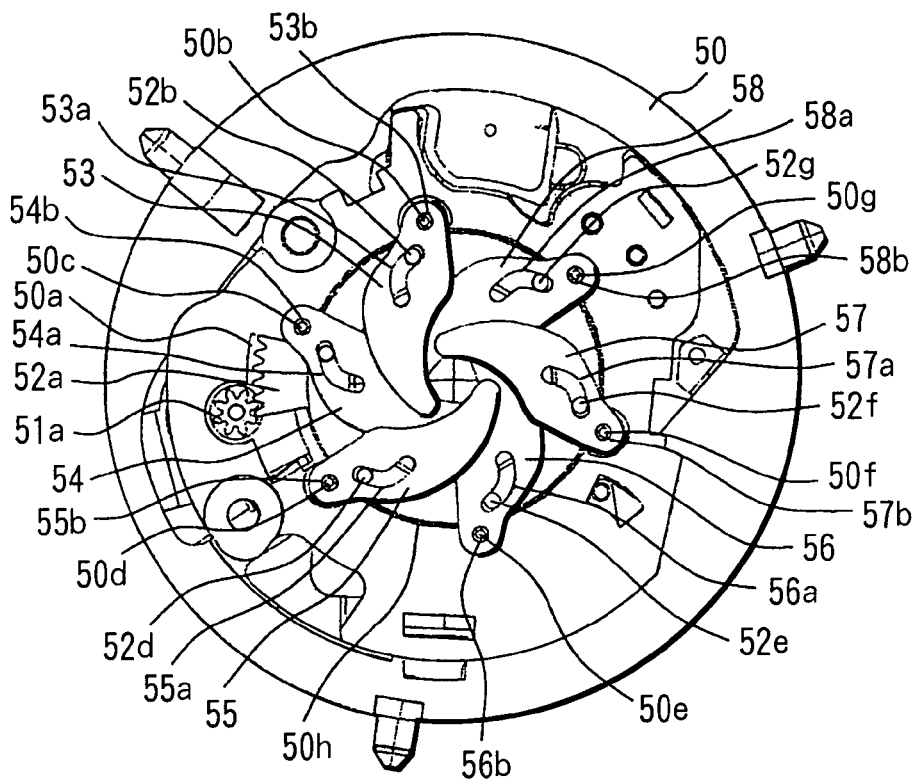
FIG. 8 shows a construction of the diaphragm mechanism in the closed state.

The arrangement and operation of the diaphragm unit 17 shall now be described with reference to FIGS. 7 and 8. Here, FIG. 7 shows the arrangement of the diaphragm unit 17 in the open state, and FIG. 8 shows the arrangement of the diaphragm unit 17 in the closed state. Cam groove portions 53a, 54a, 55a, 56a, 57a, and 58a are respectively formed in diaphragm blades 53, 54, 55, 56, 57, and 58 that make up the diaphragm unit 17, and cam pins 52b, 52c, 52d, 52e, 52f, and 52g, formed on the top surface of a diaphragm drive ring 52, respectively engage with to the cam groove portions 53a to 58a.

Protrusions 50b, 50c, 50d, 50e, 50f, and 50g are provided on a diaphragm base plate 50, which is fixed to the object side face of the second lens unit holding barrel 14. By these protrusions 50b to 50g engaging respectively with hole portions 53b, 54b, 55b, 56b, 57b, and 58b, formed in the respective diaphragm blades 53 to 58, the respective diaphragm blades 53 to 58 are supported rotatably.

A stepping motor 51 for driving the diaphragm blades 53 to 58 is fixed to the diaphragm base plate 50. The output shaft of the stepping motor 51 is passed through a through hole portion 50a with fan-like form, which is formed in the diaphragm base plate 50, and a gear 51a is mounted to a front end portion of the output shaft. The gear 51a engages with a fan-shaped gear 52a, which is formed on an outer circumferential portion of the diaphragm drive ring 52.

When the stepping motor 51 is driven, the rotational force of the gear 51a is transmitted to the gear 52a and the diaphragm drive ring 52 begins a rotational operation along the inner circumference of a recessed portion 50h that is formed circularly in the diaphragm base plate 50.

Here, the moving amount in the rotational direction of the gear 52a that is formed on the diaphragm drive ring 52 is set to be larger than the through hole portion 50a, and the rotation range of the diaphragm drive ring 52 is restricted by the contacting of both ends of the gear 52a with both end faces of the through hole portion 50a.

When the diaphragm drive ring 52 begins the rotational operation, the respective diaphragm blades 53 to 58 move in accordance with the cam tracks of the cam groove portions 53a to 58a, and the opening area of the diaphragm opening that is formed by these diaphragm blades 53 to 58 changes.

The image pickup plane tilt correction mechanism shall now be described. Due to the decentering and tilt of the respective lenses and the decentering and tilt of the lens holding members that make up an optical system, it is difficult to prepare an optical system as designed with respect to a central position. In a case where an optical system deviates from the designed optical center, an object image forming surface and a package surface may not necessarily be perpendicular to the optical axis.

The image pickup plane may thus be tilted with respect to the optical axis. Since the image pickup plane and the package surface may not be necessarily parallel but may be tilted with respect to each other, if mounting is performed using a CCD package as a reference, the abovementioned tilt may affect the optical system.

Due to these two factors, even if the optical system is in-focus state with respect to the center of the image pickup plane, the focus may be off in opposite directions at two points across the center of the image pickup plane. Thus in order to achieve in-focus on as much of the entirety of the image pickup plane as possible, the tilting of the image plane of the object image formed by the optical system and the tilting of the CCD sensor must be corrected at the same time.

Figure 9:
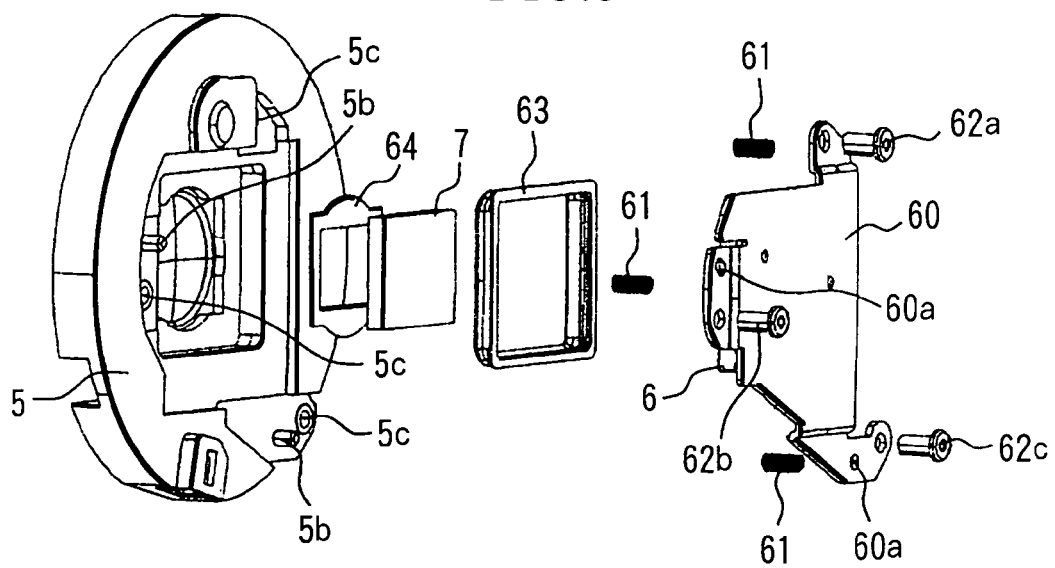
FIG. 9 is an exploded perspective view of a correction mechanism for correcting the tilting of an image pickup plane.

FIG. 9 is an exploded perspective view of the image pickup plane tilt correction mechanism. The CCD sensor 6 has an image pickup plane in its interior and is fixed by being adhered onto a CCD holding plate 60.

A pin portion 5b, which is formed on a CCD base plate 5, is inserted with minute play in a hole portion 60a, formed in the CCD holding plate 60. And the pin portion 5b defines the position of the image plane orthogonal to the optical axis.

Reference Numeral 63 denotes a rubber that prevents the entry of dirt, etc., onto the CCD plane, and Reference Numeral 64 denotes a CCD mask sheet, which blocks light besides of the image taking light flux.

At the face of the CCD base plate 5 that contacts the CCD sensor 6, hole portions 5c are formed at three locations, and in each of the hole portions 5c, an adjustment spring 61 is inserted in a charged state.

The adjustment springs 61 are sandwiched by the CCD base plate 5 and the CCD holding plate 60, and by receiving the spring force of the charged adjustment springs 61, the CCD holding plate 60 is pushed away from the CCD base plate 5 in the optical axis direction.

Adjustment screws 62a, 62b, and 62c are respectively fastened in three corresponding hole portions 5c formed in the CCD base plate 5 and press the CCD holding plate 60, which is biased in the optical axis direction by means of the adjustment springs 61, toward the CCD base plate 5. By rotating the three adjustment screws 62a, 62b, and 62c, the tilt of the image pickup plane with respect to the optical axis can be eliminated.

An optimal positioning of parts inside the lens apparatus, for making the lens apparatus in the collapsed state compact in the optical axis direction and radial direction, shall now be described.

In the present embodiment, the third lens unit holding barrel 15, holding the third lens unit 3, which is positioned at the most image pickup plane side among the first lens unit 1, second lens unit 2, and third lens unit 3 that move in the optical axis direction, is incorporated in the second lens unit holding barrel 14. Since the lens apparatus as a whole can thus move towards the image pickup plane side in the collapsed state, the total length of the lens apparatus in the optical axis direction can be made small.

Figure 10:
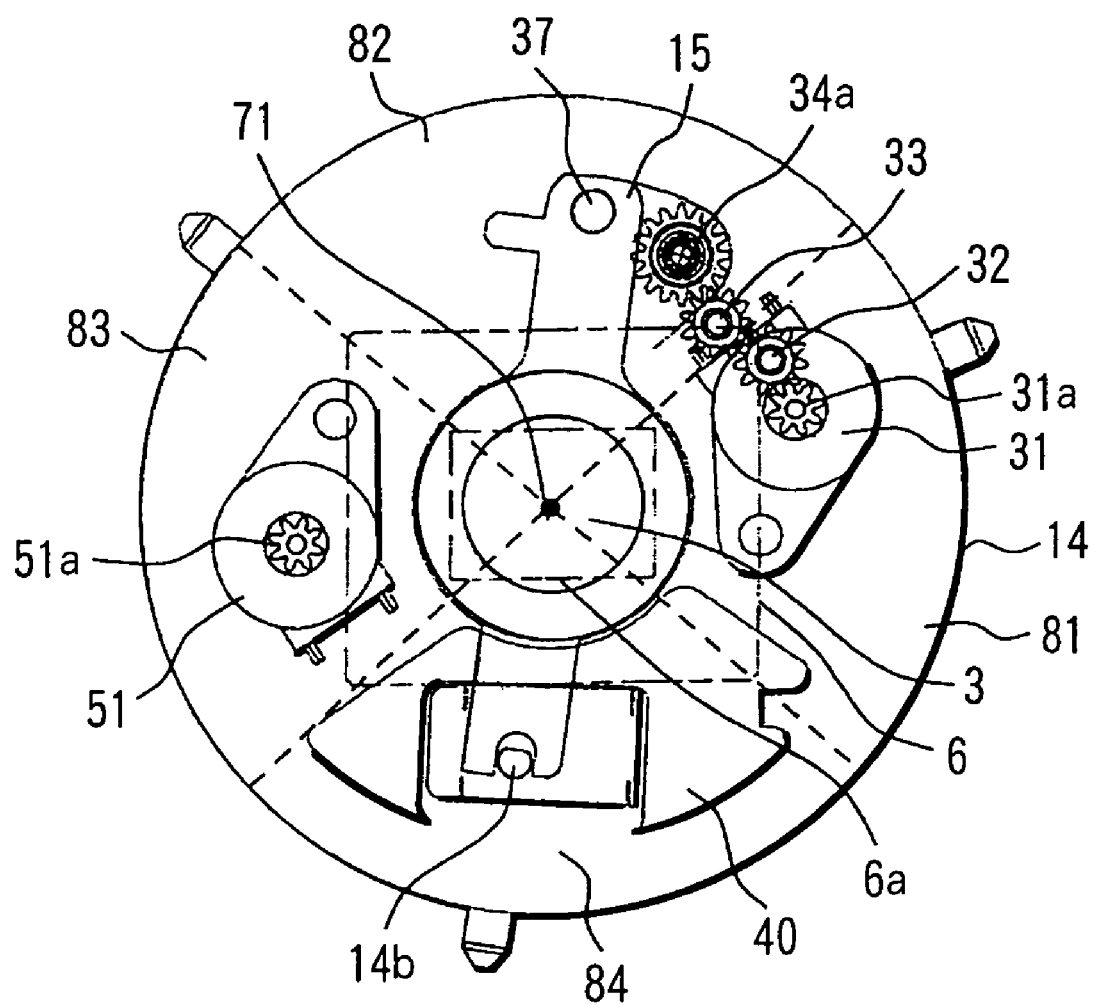
FIG. 10 is a diagram showing a second barrel on which a stepping motor, etc. are mounted, viewed along the optical axis direction.
Figure 11:
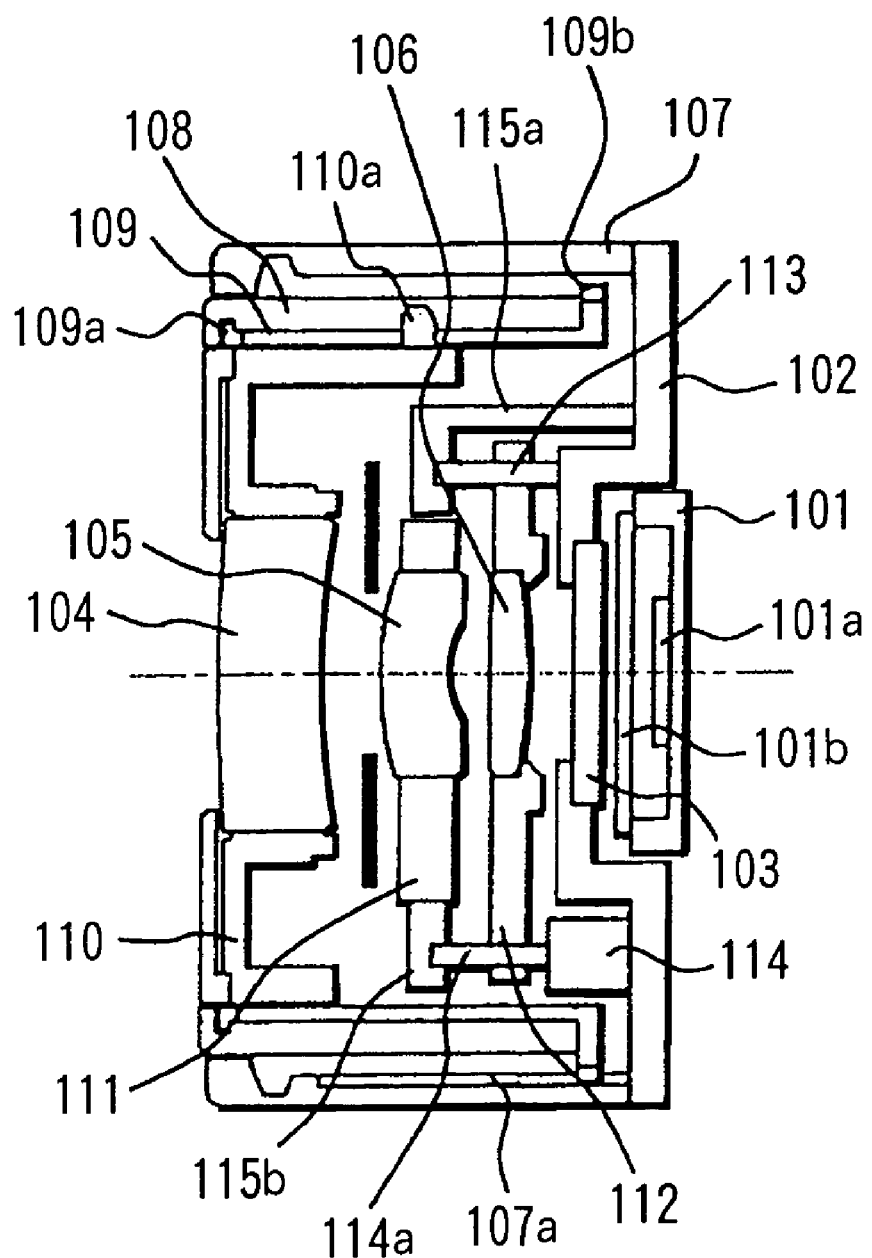
FIG. 11 is a sectional view including the optical axis of a conventional lens apparatus in the collapsed state.
Figure 12:
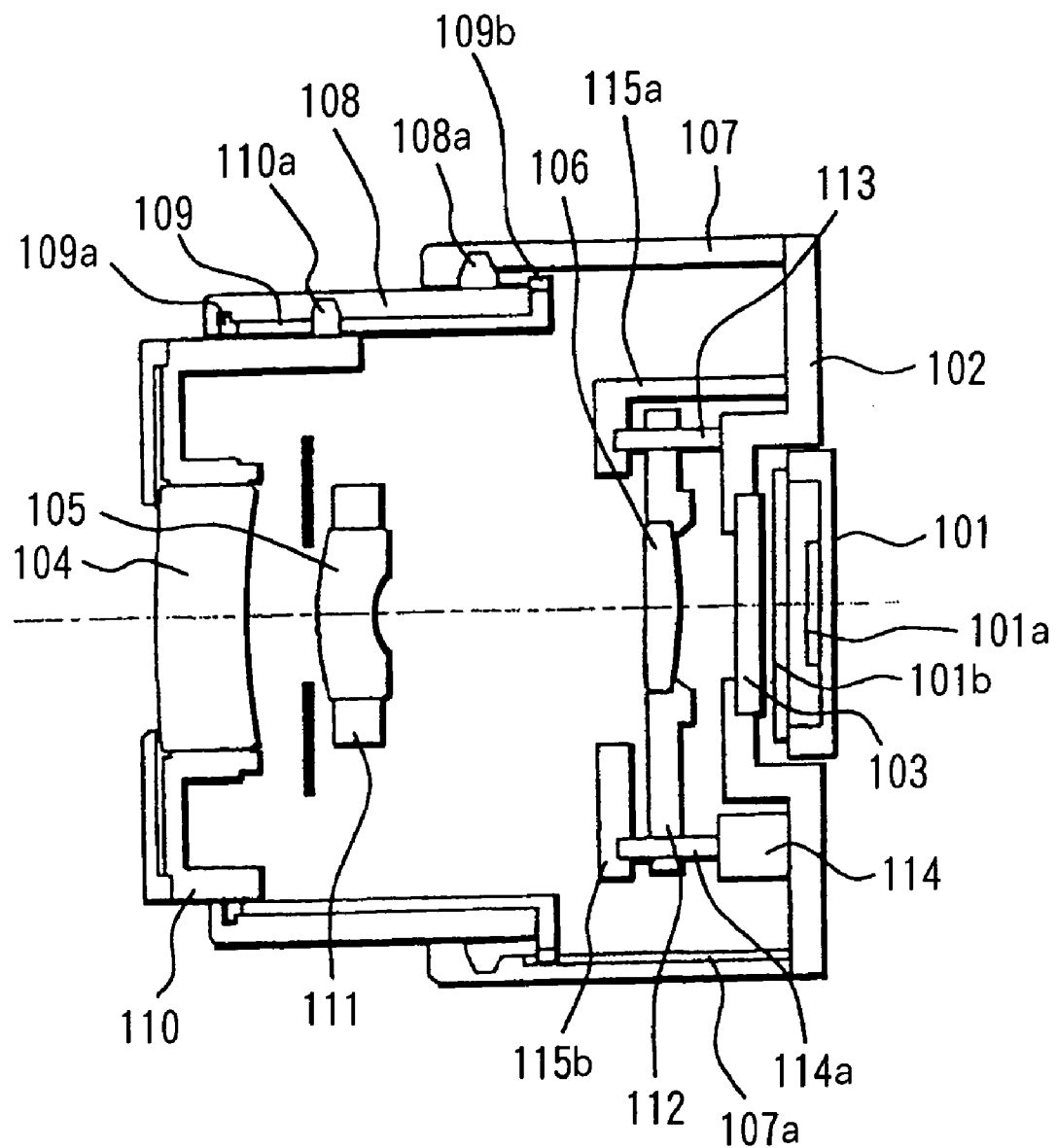
FIG. 12 is a sectional view including the optical axis of the conventional lens apparatus in the image taking state.
Figure 13:
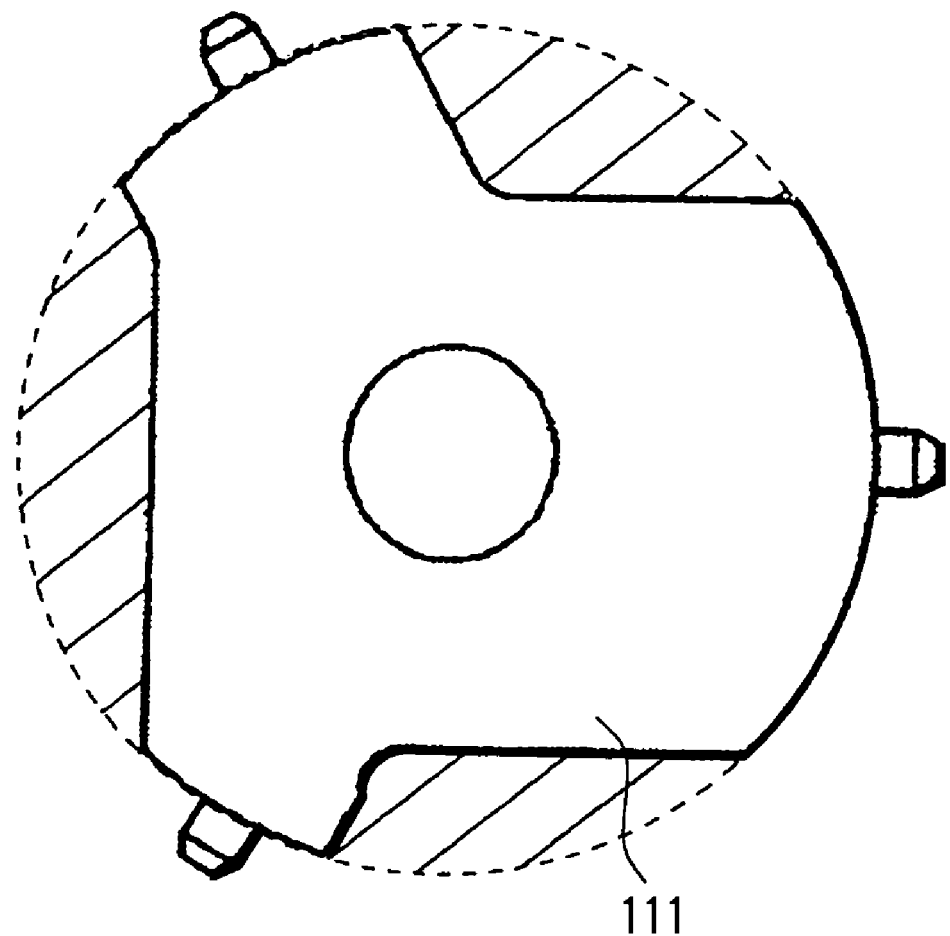
FIG. 13 is a front view of a second barrel in the conventional lens apparatus.

The positional relationship of the stepping motors 31 and 51, the guide shaft 37, the auxiliary guide shaft 14b, and the CCD sensor 6 shall now be described using FIG. 10. Here, FIG. 10 is a view of the second lens unit holding lens barrel 14 as viewed in the optical axis direction, and the image pickup element 6 is projected onto a central portion thereof.

In order to make the image taking light flux reach the CCD sensor 6, it is preferable to position the stepping motors 31 and 51, the guide shaft 37, and the auxiliary guide shaft 14b at the outer sides of the regions corresponding to an effective image pickup plane 6a of the CCD sensor 6, the optical LPF 7, and the fourth lens unit 4. However, since the stepping motors 31 and 51 are elements that are large both in terms of area and volume, depending on the mounting positions, the second lens unit holding barrel 14 may become large in the radial direction.

Thus in the present embodiment, the region of the second lens unit holding barrel 14 is divided into the four regions of a mounting region 81, a mounting region 82, a mounting region 83, and a mounting region 84 by radial lines passing from the optical axis 71 through positions corresponding to the four corners of the CCD sensor 6, and the abovementioned parts are positioned in the respective regions 81 to 84 as follows.

That is, the output shaft of the stepping motor 31, which is the drive source of the third lens unit 3 (focusing lens) is positioned in the mounting region 81, and the guide shaft 37, which guides the third lens unit 3 in the optical axis direction, is positioned in the second mounting region 82. The output shaft of the stepping motor 51, which is the drive source of the diaphragm blades 53 to 58, is positioned in the third mounting region 83, and the auxiliary guide shaft 14b, which guides the third lens unit 3 in the optical axis direction, is positioned in the fourth mounting region 84. The gear 31a and the gear 32 are positioned in the mounting region 81, and the gear 33 and the screw 34a are positioned in the mounting region 82.

Since the space formed in the second lens unit holding barrel 14 can thus be utilized effectively, the second lens unit holding barrel 14 can be made compact in the radial direction.

If the distance from the third lens unit 3 to the guide shaft 37 becomes long, in a case where there is play, the tilting of the third lens unit 3 with respect to the optical axis 71 may become large and the optical performance may become degrade. It is thus preferable to position the guide shaft 37 in the mounting region 82, which corresponds a long side portion of the CCD sensor 6, so that the axial distance between the optical axis 71 and the guide shaft 37 will not become large.

As shown in FIG. 10, the projection of the CCD sensor 6 is rectangular. The mounting regions 82 and 84, which correspond the long side portions of the CCD sensor 6, are thus wider in area, that is, in the space for positioning parts than the mounting regions 81 and 83, which correspond the short side portions of the CCD sensor 6.

As shown in FIG. 1, in the collapsed state, the guide shaft 37 and the auxiliary guide shaft 14b are positioned outside the region "A" shown by a slanted line, which includes the image pickup element 6. Since the guide shaft 37 and the auxiliary guide shaft 14b can thus be positioned towards the back face side of the camera, the total length of the lens apparatus in the optical axis direction can be made compact.

If the guide shaft 37 can be positioned more towards the back face side of the camera, the length of the guide shaft 37 can be made long correspondingly. Tilting of the third lens unit 3 due to play between the third lens unit holding barrel 15 and the shaft can thus be lessened, and high-precision drive of the third lens unit holding barrel 15 with little image blur, can be realized.

If the distance between the stepping motor 31 and the guide shaft 37 is too short, the structure of the third lens unit holding barrel 15, which holds the third lens unit 3 serving as the focusing lens, must be made large in order to avoid interference with the stepping motor 31.

As mentioned above, in the present embodiment, the stepping motor 31 is positioned in the mounting region 81 and the guide shaft 37 is positioned in the mounting region 82, which is adjacent the mounting region 81. Since the stepping motor 31 and the guide shaft 37 can thereby be positioned with a predetermined distance in between so that the abovementioned interference will not occur, the third lens unit holding barrel 15 can be made compact.

Furthermore, in the region surrounding the guide shaft 37, the screw 34b, the coil spring 38, and mounting members for mounting these parts must be positioned. In the present embodiment, since the guide shaft 37 is positioned in the mounting region 82 of large area, the space inside the second barrel 18 can be utilized effectively and the second lens unit holding barrel 14 can be made compact in the radial direction.

Furthermore, in regard to the auxiliary guide shaft 14b, since the dimensions of the auxiliary guide shaft 14b can be set to be smaller than those of the guide shaft 37, the amount by which it penetrates into the second barrel 18 can be lessened. Thus with this embodiment, the guide shaft 37 and the auxiliary guide shaft 14b are positioned respectively in the mounting region 82 and the mounting region 84, which is symmetrical to the mounting region 82, and the auxiliary guide shaft 14b and the shutter drive unit 40 are positioned so as to overlap in the optical axis direction. The distance between the guide shaft 37 and the auxiliary guide shaft 14b can thus be maintained to realize stable focus drive while making the lens apparatus compact in the optical axis direction.

In the second barrel 18, it is preferable that the openings as viewed from the image pickup plane side, which are provided in the prior art, be made as few as possible in order to avoid leakage of light rays. Thus in the present embodiment, the respective parts of the focusing unit 30, which performs focusing operation and includes the third lens unit holding barrel 15, are mounted in the second barrel 18, and portions of the second barrel 18 that must be notched due to the component parts of the focusing unit 30 are thereby eliminated. Since the focusing unit 30 is not mounted to the CCD base plate 5, the area in which the lens apparatus in housed can be made small as well.

While preferred embodiments have been described, it is to be understood that modification and variation of the present invention may be made without departing from the scope of the following claims.

"This application claims priority from Japanese Patent Application No. 2003-394267 filed on Nov. 25, 2004, which is hereby incorporated by reference herein."

What is claimed is:

1. A lens apparatus, forming an object image on an image pickup element, comprising:
    a first member which is movable in the optical axis direction and holds a first lens unit;
    a second member which holds a second lens unit and the first member;
    a first motor which is mounted to the second member and generates a driving force for driving the first member;
    a diaphragm unit which is mounted to the second member and performs open and close operations;
    a second motor which is mounted to the second member and generates a driving force for driving the diaphragm unit; and
    a guide member which is mounted to the second member and guides the first member in the optical axis direction; and
    wherein, in a case where a region of the second member viewed in the optical axis direction is divided into four regions by lines extending from the optical axis to positions corresponding to four corners of the image pickup element, the output shaft of the first motor is positioned in a first region of the four regions, the output shaft of the second motor is positioned in a second region, and the guide member is positioned in a third region.

2. The lens apparatus according to claim 1, wherein the first region and the third region are adjacent to each other, and a transmission mechanism, which transmits the driving force generated by the first motor to a transmission shaft driving the first member and being positioned in the third region, is positioned in the first region and the third region.

3. The lens apparatus according to claim 1, further comprising:
    an auxiliary guide member which guides the first member in the optical axis direction;
    a shutter unit which is mounted to the second member and performs open and close operations; and
    a third motor which generates a driving force for driving the shutter unit;
    wherein at least one of the auxiliary guide member and the third motor is positioned in the fourth region of the four regions.

4. An image taking apparatus comprising:
    the lens apparatus according to claim 1; and
    an image pickup element which photoelectrically converts an object image formed by the lens apparatus.

* * * * *

UNITED STATES PATENT AND TRADEMARK OFFICE
CERTIFICATE OF CORRECTION

PATENT NO. : 7,016,123 B2 Page 1 of 1
APPLICATION NO. : 10/991432
DATED : March 21, 2006
INVENTOR(S) : Yukiteru Yano It is certified that error appears in the above-identified patent and that said Letters Patent is hereby corrected as shown below:

COLUMN 7
Line 55, "with to" should read --with--.

COLUMN 9
Line 66, "degrade." should read --degraded.--.
Line 67, "a long" should read --to a long--.

COLUMN 10
Line 6, "the long" should read --to the long--.
Line 8, "correspond" should read --correspond to--.

Signed and Sealed this

Twenty-sixth Day of December, 2006

JON W. DUDAS
*Director of the United States Patent and Trademark Office*